July 26, 1966  C. L. RICHARDS, JR  3,263,107
MAGNETIC COUPLING
Filed Dec. 3, 1962  2 Sheets-Sheet 1
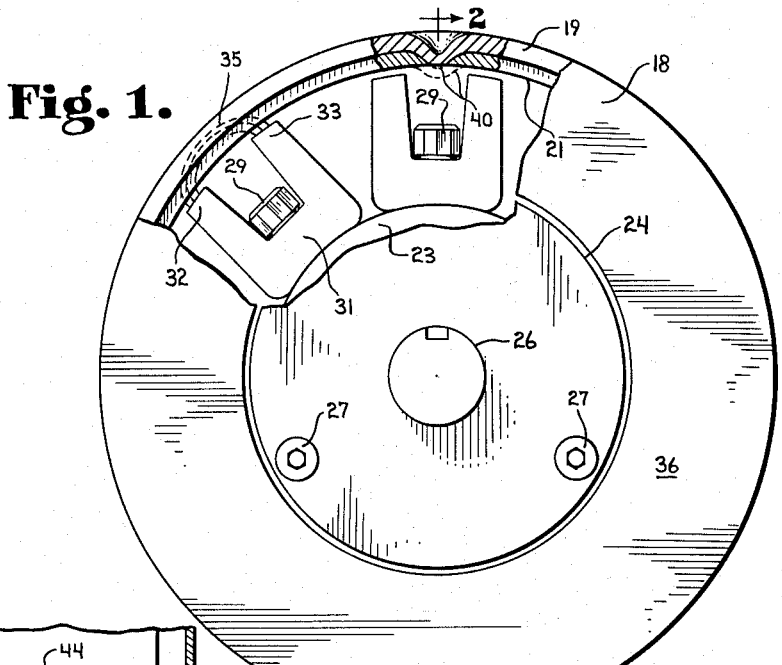
Fig. 1.
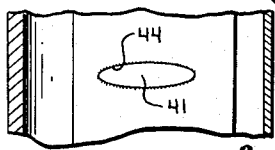
Fig. 3.
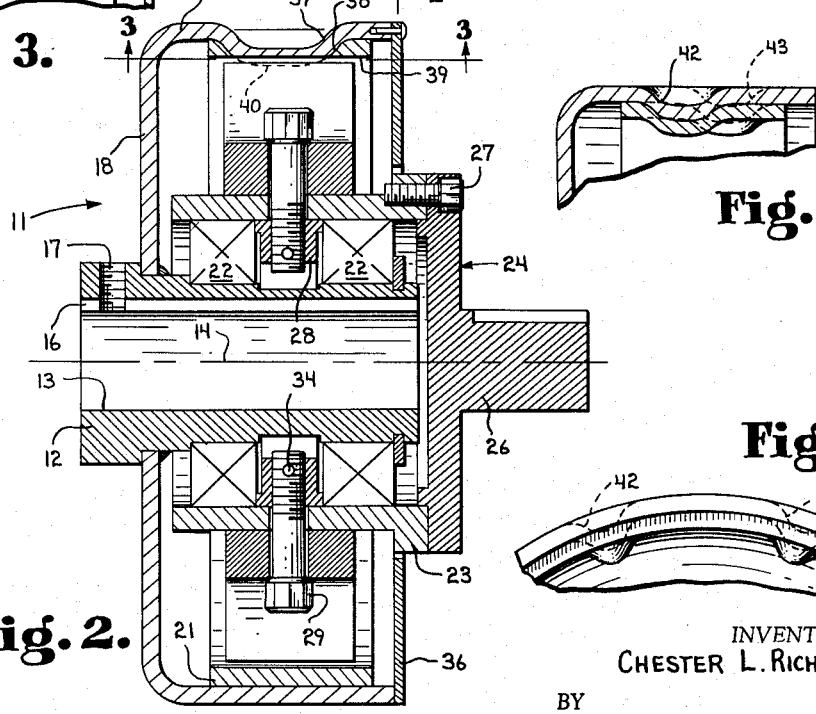
Fig. 2.
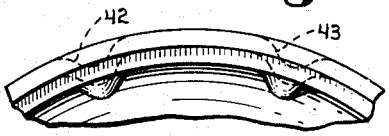
Fig. 4.
Fig. 5.
INVENTOR.
CHESTER L. RICHARDS, JR.
BY
Lockwood, Woodard, Smith & Weikart
Attorneys July 26, 1966 C. L. RICHARDS, JR 3,263,107
MAGNETIC COUPLING Filed Dec. 3, 1962 2 Sheets-Sheet 2

INVENTOR.
CHESTER L. RICHARDS, JR.
BY
*Lockwood, Woodard, Smith & Weikart*
Attorneys

United States Patent Office 3,263,107
Patented July 26, 1966

3,263,107
MAGNETIC COUPLING
Chester L. Richards, Jr., Indianapolis, Ind., assignor to Magnetic Devices, Inc., Lawrence, Ind., a corporation of Indiana
Filed Dec. 3, 1962, Ser. No. 241,731
2 Claims. (Cl. 310—106)

This invention relates generally to magnetic couplings and more particularly to a magnetic coupling of the type requiring no friction or liquid elements to achieve the coupling function.

At the present time, there are magnetic couplings known in the art which incorporate two rotor members, one having a bimetallic shell assembly thereon and the other having a plurality of magnets thereon. The two rotors are relatively rotatable and the magnets are placed in proximity to the bimetallic shell assembly to induce currents in the shell assembly during relative rotation between the rotors, and thereby create a coupling torque.

Couplings of the general type just described have advantages over other types of couplings and these include simplicity of construction, reliability, and smoothness of operation, to name a few. Another characteristic of these couplings is that fact that to some extent heretofore it has been possible to obtain some variation in performance characteristics of the couplings. However, prior to the present invention, the possibility of obtaining a wide range of possible performance characteristics has been severely limited. Moreover, though the couplings have been simple in construction compared to some types of magnetic clutches or drive units, they have still presented some serious manufacturing problems.

It is therefore a general object of the present invention to provide an improved magnetic coupling.

A further object is to provide a magnetic coupling which is extremely simple and durable in construction and reliable in operation.

A further object is to provide a magnetic coupling which lends itself to ease of manufactuer and low cost.

A further object is to provide a magnetic coupling construction of a type whereby various desired performance characteristics can easily be predetermined in manufacture.

A further object is to provide a coupling construction whereby desired flux control can be obtained both by the relative motion between the parts and by variations in air gap.

Described briefly, a typical embodiment of the present invention incorporates two rotors mounted to each other for relative rotation therebetween on a common axis. One rotor includes a bimetallic shell assembly whereas the other rotor includes a plurality of permanent magnets circumferentially spaced in a row. The bimetallic shell assembly is obtained by inserting an annular ring of a non-magnetic electrically conductive material into a cylindrical shell of a ferromagnetic material. Then dimples or depressions are made in the shell and annular ring combination whereby the two parts are permanently secured together. The depth and shape of the depressions can readily be controlled to obtain the desired flux control in the coupling.

The full nature of the invention will be understood from the accompanying drawings and the following description and the claims.

FIG. 1 is a shaft end view of a typical embodiment of the present invention with a portion being broken away to illustrate certain interior details.

FIG. 2 is a section taken along the line 2—2 in FIG. 1.

FIG. 3 is a fragmentary view looking in the direction of the arrows on line 3—3 in FIG. 2 and illustrating a typical appearance at one of the dimpled locations.

FIG. 4 is a fragmentary view similar to FIG. 2 and showing an optional type of construction and illustrating the appearance of the parts before a machining operation.

FIG. 5 is an enlarged fragmentary end view of the area illustrated in FIG. 4.

Figure 6:
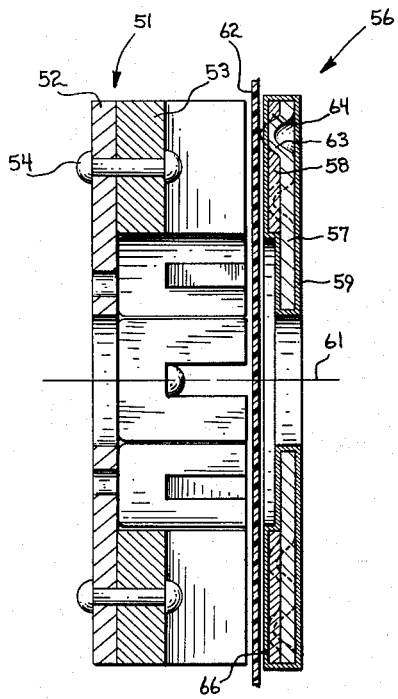
FIG. 6 is a section taken along the axis of a second embodiment of the present invention wherein discs are employed rather than cylinders.

Referring to the drawings, and particularly FIGS. 1 and 2, a first rotor 11 includes a hub 12 having a cylindrical bore 13 with an axis 14 and having a keyway 16. Provision for a setscrew is made by means of the threaded hole 17.

A generally cup-shaped bimetallic shell assembly is provided and includes the cup-shaped shell 18 welded to the hub 12 and having a cylindrical wall 19. This portion is normally made of a ferromagnetic material and is typically made of steel. A cylindrical ring 21 is secured to the wall 19 by means which will be hereinafter described. The ring 21 is normally made of a non-magnetic electrically conductive material such as copper for example.

Anti-friction bearings 22 are used to mount the hub 23 of the second rotor 24 to the hub 12 of the first rotor 11. A flanged adapter shaft member 26 may be secured to the hub 23 by any suitable means such as the screws 27. Thus it is seen that the hub of the first rotor and the adapter shaft member 26 of the second rotor have colinear axes, and the two rotors are therefore relatively rotatable on the axis 14.

A spacer 28 is disposed adjacent the inner cylindrical surface of the hub 23 and maintains the separation between the bearings 22. The spacer also receives the cap screws 29 which are employed to secure the magnets 31 to the hub 23. Each of the magnets 31 has a pair of poles 32 and 33 establishing a flux path 35 through the shell wall 19. In a typical example, a circular row of eight permanent magnets may be employed in a coupling where the inside diameter of the ring 21 is approximately 4½ inches. The cap screw 29 may be provided with a nylon insert 34 or other suitable means to provide a self-locking feature. A dust shield 36 may also be employed if desired.

According to the present invention, a dimple 37 is provided in the wall 19 and a mating dimple 38 is provided in the annular member 21. These mating dimples secure the ring 21 to the wall 19. Typically, the dimples are made simultaneously in the manufacture of the bimetallic shell assembly and can be easily obtained in a punching type of operation whereby each dimple is simply a deformation of the parent metal of the part in which it is formed. It will be recognized, of course, that when the punching operation is completed the appearance of the dimples will be much like that shown in FIGS. 4 and 5. The smooth cylindrical inner circumferential surface 39 is obtained after the dimpling operation, by machining the tips 40 (FIGS. 1 and 2) off the dimples.

While only one dimple is shown in FIG. 2, it is desirable to provide a number of dimples circumferentially spaced around the bimetallic shell assembly. All could be produced simultaneously in a multiple-punch fixture. Where a single row of dimples of the type shown in FIG. 2 is used, nine dimples at a spacing of approximately 40 degrees apart has been found satisfactory, though other numbers and spacings may also be found satisfactory.

If the dimpling has been carried to the depth indicated by the dotted lines in FIGS. 1 and 2, and is symmetrical about a vertical plane containing the axis 14 and line 2—2 in FIG. 1, a portion of the wall 19 will be exposed at the inner surface 39 after machining and may appear as illustrated in FIG. 3 and designated by reference numeral 41.

It will be apparent that dimples in a variety of shapes can readily be obtained by the punching operation according to the present invention and the elliptical shape produces an exposed surface 41 in an elliptical shape as shown. In this manner, a very large proportion of the effective area of the magnetic poles of the magnets 31 can be used in obtaining the flux control necessary to obtain the performance characteristics desired. Also, it should be noted that, if desired, the depth of the dimples can be made substantially less than shown, whereupon the subsequent machining will not expose the inner surface of the wall 19 at the dimple but will leave a thin skin of the ring 21 covering it. The air gap between the ferromagnetic material and a magnetic pole varies as the pole passes a dimple and the depth of the dimple affects the degree of variation of the air gap. Of course, the depth of the dimpling and the shape of the dimples as well as their number and spacing will depend largely on the specific performance characteristics desired. In any event, a sufficient number and depth of dimples can be provided to permanently secure the ring to the wall 19.

If for some reason it is found desirable to employ more than one row of dimples per row of magnets, this can easily be done. An example is illustrated in FIGS. 4 and 5 where two rows of dimples are shown. By way of example, five dimples could be employed in row 42 and five dimples could be employed in row 43. In each of the rows, the dimples could be spaced at 72 degrees apart if desired, and each dimple in one row could be circumferentially offset from a corresponding dimple in the second row by approximately 36 degrees. The number and spacing of dimples can be varied at will depending upon the performance characteristics desired and manufacturing equipment available. Likewise, additional rows of magnets and dimples can be provided for greater power handling capacity.

It might be mentioned at this point that it has been found that during machining of the surfaces 39, when the wall 19 is exposed as at 41 in FIG. 3, a burring action can be obtained around the margin 44 where the outer surface of the ring meets the inner surface of the wall 19. The extent of burring can be controlled by the machining and tends to further anchor the ring 21 with the wall 19. It should be understood, however, that adequate interlocking between the dimples 37 and 38 can nevertheless be obtained without dimpling so deep as to even expose the wall 19 upon machining.

In operation of the present invention, relative rotation between the rotors produces induced currents in the shell assembly resulting in the establishment of a coupling torque. The dimples control the flux paths of the magnets. In a given coupling, the amount of relative rotation (slip speed) of the coupling determines the coupling torque produced. However, taking two couplings of the same size, the present invention permits the amount of torque produced at a given slip speed for one coupling to be made different from that of the other coupling at the same slip speed, by making the dimples of one coupling, as compared to the other coupling, different in size, shape, depth, location or number. Likewise, combinations of these parameters can be made such that the difference between the respective torque produced by the two couplings at another slip speed can be made greater than, the same as, or less than the difference at the one slip speed. Thus, it is seen that the present invention makes possible the manipulation of many parameters heretofore unavailable for use in obtaining the various torque-slip speed curves desired for different coupling applications.

Referring specifically to the embodiment illustrated in FIG. 6, rotor 51 includes a circular disc 52 having a plurality of permanent magnets 53 secured thereto by any suitable means such as, for example rivets 54. A second rotor 56, also in the form of a circular disc, includes a first member 57 of ferromagnetic material and a second member 58 of non-magnetic electrically conductive material. The assembly of the two members is encased in a non-magnetic annular casing 59 which may be constructed of stainless steel, for example. It should be understood that the rotor 51 and rotor 56 are mounted for relative rotation of one with the respect of the other on the axis 61. The mounting means can be external or can be a part of the coupling itself, as desired, depending on the application of the coupling, and therefore, no specific parts are illustrated in FIG. 6 for mounting the rotors in this example.

Also, a non-magnetic membrane or diaphragm 62 is shown in the air gap between the poles of the magnets 53 and the rotor 56 and such a member could be employed if desired in an application where devices connected to one of the rotors are to be environmentally isolated from the other rotor.

In a manner similar to that described above for assembling the bimetallic shell assembly, member 57 and member 58 of the rotor 56 have mating dimples 63 and 64, respectively, circumferentially spaced around the members. In the illustrated embodiment, two circular rows of dimples are employed and the angular index of the dimples of one row may be considered to be different from that of the other row, for example. As is the case with the previously described embodiment of the invention, the number and spacing of the dimples can be varied as desired to achieve the performance characteristics as desired. Also, the shape and depth of the dimples can be varied. A thin skin of the non-magnetic member 58 may be left covering the dimple in the ferromagnetic member 57, or machining may be carried to an extent exposing the dimple of the ferromagnetic member at the face 66 of the non-magnetic member 58.

In the embodiment of FIG. 6, the dimples, of course, provide the magnetic flux control desired and prevent relative rotation between two members of the rotor 56. In units where it is not desired to encase the bimetallic assembly, axial attachment of the members 57 and 58 may be obtained by causing suitable burring on the protruding dimples of the member 57 at the face 66 or by such other means as may be desired. It should be recognized, of course, that in a device having a disc-type rotor such as shown in FIG. 6 according to present invention, mechanism can be added to vary the air gap between the magnetic member by axial movement of one of the rotors with respect to the other. In this manner, the performance characteristics of an individual unit can be varied substantially as desired during the operation of the unit.

It can readily be seen that the present invention achieves all the objects set out hereinabove. Of course, it also provides benefits and has advantages which have not been specifically mentioned above and more of which will be appreciated as the invention becomes known in the art.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A magnetic coupling comprising: a circular shell of ferromagnetic material, an annular cylindrical ring of non-magnetic electrically conductive material secured to said shell coaxially therewith and on the inner circumferential cylindrical surface thereof, said ring having front and rear circular marginal edges of equal diameter, a rotor mounted coaxially with said shell for revolution therewithin on an axis colinear with the axes of said rotor and said shell, said rotor having a plurality of permanent magnets therein disposed in closely spaced relation to said ring and establishing flux paths in said ring, said shell and said ring having interengaging portions originally formed as rounded dimples to limit relative movement between said shell and said ring and serving as the only means securing said shell and said ring together, said portions having elliptical cross sections in planes parallel to the said axis of revolution to provide a desired variation of flux paths upon revolution of said shell with respect to said rotor.

2. A coupling as set forth in claim 1 wherein said interengaging dimpled portions include a plurality of circumferentially spaced depressions in said shell and a plurality of circumferentially spaced depressions in said ring and mating with the depressions in said shell, whereby relative rotation between said shell and said ring is prevented.

References Cited by the Examiner

UNITED STATES PATENTS

| | | | |
|---|---|---|---|
| 2,650,119 | 8/1953 | Booth | 29—510 |
| 2,754,438 | 7/1956 | Zozulin | 310—105 |
| 2,769,932 | 11/1956 | Zozulin | 310—105 |
| 2,929,946 | 3/1960 | Aske | 310—166 |

FOREIGN PATENTS 958,241   9/1949   France.

MILTON O. HIRSHFIELD, *Primary Examiner.*

DAVID X. SLINEY, ORIS L. RADER, *Examiners.*